United States Patent Office 3,306,744 Patented Feb. 28, 1967

3,306,744

COPYING PROCESS USING DITHIOXAMIDES, HEAVY METAL SALTS AND PHOTOPOLYMERIZABLE MONOMERS AND PHOTOCROSS LINKABLE POLYMERS

Howard C. Haas, Arlington, Mass., assignor to Polaroid Corporation, Cambridge, Mass., a corporation of Delaware No Drawing. Filed Dec. 17, 1962, Ser. No. 244,912 17 Claims. (Cl. 96—29)

This invention relates to a novel photographic process and to novel photosensitive elements for use therein.

One object of this invention is to provide a novel copy process utilizing the reaction between a dithioxamide compound and a heavy metal salt.

Another object of this invention is to provide a novel copy sheet comprising a layer of a dithioxamide compound and a layer of photosensitive material and a receiving sheet containing a layer of a heavy metal salt.

Still another object is to provide a novel process for forming a photographic image utilizing the reaction between dithioxamide and a heavy metal salt.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The reaction between dithioxamide compounds and heavy metal salts which produces dense precipitates is known to the art. This type of reaction, particularly the reaction between dithioxamide and a mixture of nickel and copper salts which produces a dense black mark, is of particular interest in copy or duplicating processes. This class of reactions is utilized in the novel copy process of this invention.

The novel copy sheet of this invention may be prepared by applying, to a base or a support, a layer of a dithioxamide compound, and covering said dithioxamide layer with a layer of photosensitive material which, upon exposure to light of a particular wave length and intensity, will harden or cross-link whereby the extraction of the dithioxamide compound by a liquid reaction medium or processing solution through the exposed layers of photosensitive material is restrained. The unexposed regions of the photosensitive layer will permit diffusion of the dithioxamide compound at a more rapid rate. A second or receiving sheet may be prepared by coating a support, preferably paper, with a layer of a heavy metal salt or a mixture of salts.

The novel process of this invention may be carried out by placing the material to be copied, e.g., a printed page, facedown on top of the photosensitive layer of copy sheet and exposing the unit, through the material to be copied, to radiation of a wave length to which said layer is photosensitive. After exposure, the material to be copied is removed and the receiving sheet is superimposed over the photosensitive layer of the copy sheet and a processing composition is spread therebetween. The dithioxamide compound will transfer more rapidly through the unexposed portions of the photosensitive layer and will react with the contiguous portions of the heavy metal salt layer of the receiving sheet thereby forming a dense precipitate on said receiving sheet corresponding in shape and area to the characters on the original printed page. The hardening of the photosensitive material by the exposure to actinic radiation slows the diffusion of the dithioxamide compound to such an extent to permit the preferential or differential extraction of dithioxamide through the unhardened areas, that is, the areas coextensive with the printing on the printed page. When the extracted dithioxamide compound reaches the surface of the receiving sheet, the reaction with the heavy metal salt results in a precipitate which is deposited on the receiving sheet. The difference in the rates of extraction permits the formation of the printed image and removal of the receiving sheet with its thus-formed copy before any diffusion of the dithioxamide compound occurs through the treated or exposed portions of the photosensitive layer.

The dithioxamide layer may be applied to the base or support by coating the surface of the support with a solution of a dithioxamide compound and drying. A solution may comprise, for example, dithioxamide in chloroform. Since dithioxamide may inhibit the photoreaction, e.g., photopolymerization of the photosensitive layer, it may be desirable to put the dithioxamide into a polymer layer on the support. Preferably, a water-soluble polar polymer, such as polyvinyl alcohol or gelatin, is used.

A great many heavy metal salts are known to the art which will react with dithioxamide compounds to produce a dense, colored precipitate. In a preferred embodiment, a mixture of nickel and copper salts are used, preferably the acetates which will produce dense black marks with dithioxamide. As stated above, such dense black marks are preferred in copy processes. Organic salts of heavy metals, e.g., nickel salicylate and acetyl acetonate, may also be used in the novel process of this invention. The heavy metal salts are preferably applied to the surface of the receiving sheet from aqueous solutions which are then dried.

The photosensitive layer overcoating the dithioxamide layer comprises a material in which a photochemical reaction takes place upon exposure to light of a particular wave length and intensity, whereby the exposed portions of said layer are rendered more resistant to the transfer of dithioxamide from the underlayer than are the unexposed portions. The photosensitive layer may comprise a monomer which will polymerize upon exposure to light of a particular wave length, a polymer which is cross-linked by radiation, or a combination of the two, e.g., a photopolymerizable monomer and a polymer which is cross-linked by radiation. When a photopolymerizable monomer is used alone, it may be desirable to disperse said monomer in a polymeric layer for ease of fabrication of the element. Since most photoreactions are slow, a photoinitiator, e.g., biacetyl or benzoin is preferably incorporated into the photosensitive layer in order to speed the photosensitive reaction. Since oxygen may inhibit polymerization in some instances, it may be desirable to protect against this by placing an overcoat over the photosensitive layer. The material selected for the overcoat layer should be one which will not interfere with the diffusion of the dithioxamide upon processing. The preferred overcoat materials are polyvinyl alcohol and methyl cellulose.

As examples of materials suitable for use in the photosensitive layer, mention may be made of diethyleneglycol dimethacrylate, tetraethyleneglycol dimethacrylate, and unsaturated esters of polyvinyl alcohol, e.g., polyvinyl cinnamates such as polyvinyl-$\alpha$-phenyl-cinnamate and polyvinyl-ortho-chloro-cinnamate.

The reaction medium or processing composition suitable for use in this invention may be any reaction medium which will dissolve the dithioxamide compound, swell the unexposed polymer layers and in which the product of the dithioxamide compound and the heavy metal salt reaction will form. The composition of the various layers in the copy sheet and the receiving sheet must therefore be taken into consideration in selecting the reaction medium for this invention. That is, the solvent should not be one which will adversely affect or react in any way with the various polymers and other materials used in the copy sheet or receiving sheet. A preferred reaction medium is water. It may also be desirable to add a volatile solvent, such as alcohol, to the reaction medium in order to provide a quick drying mixture.

A barrier layer or a sizing may be added both to the receiving sheet and the copy sheet support layer, in order to prevent the mark-forming materials from being adsorbed or striking through the paper. It may also be desirable to apply coatings to the surface of the receiving sheet to act as such a barrier and, more importantly, to provide an adsorbant-receptive layer for the reaction product. Such coatings have also been found especially useful in preventing excessive spreading of the reactants on the copy sheet thereby producing a sharp, well-defined copy of the printed material. Clays and waxes may be used satisfactorily for such purposes. In a preferred embodiment, colloidal silica, such as that sold under the tradename "Ludox" by E. I. du Pont de Nemours & Company, Wilmington, Delaware, has been found especially useful. The reaction of the heavy metal salt and the dithioxamide compound to form the precipitate may be carried out in neutral and basic solutions. It has been found, however, that the best results are obtained when the pH of the copy paper is around 10. This preferred condition may be achieved by treating the copy paper with sodium carbonate or by utilizing an alkaline reaction medium.

The reaction medium may be introduced by any suitable means, e.g., spraying, flowing, spreading, etc. In one embodiment, the reaction medium may be contained in a pod which may be ruptured to spread the said reaction medium between the superposed copy sheet and receiving sheet. The nature and construction of such rupturable pods are well known in the photographic art. See, for example, U.S. Patents Nos. 2,543,181 and 2,634,886, issued to Edwin H. Land.

In a preferred embodiment of this invention, a receiving sheet was prepared by coating a sheet of paper with a solution of nickel acetate and copper acetate and drying. A copy sheet was prepared by coating a base layer with a layer of dithioxamide in polyvinyl alcohol and superimposing, on top of said dithioxamide layer, a layer comprising 40% tetraethyleneglycol dimethacrylate in a 50–50 solution by weight of cellulose acetate phthalate and cellulose acetate, and 3% biacetyl based on the weight of the tetraethyleneglycol dimethacrylate. The thus-prepared photosensitive layer was overcoaed with polyvinyl alcohol. A printed sheet was placed facedown on top of the copy sheet and exposed for 4 minutes to the radiation from a General Electric AH–4 ultraviolet lamp with the glass shield removed. At the end of the exposure period, the printed sheet was removed and the receiving sheet was superimposed over the copy sheet and an alkaline solution of alcohol and water was spread therebetween. The receiving sheet was then stripped from the copy sheet and an image of the printed page was visible on the receiving sheet.

While the preferred reactants of this invention comprise dithioxamide and a mixture of copper and nickel acetate to form a dense black precipitate, it should be understood that other combinations of dithioxamide compounds and heavy metal salts may be used to achieve precipitates of various colors. As examples of other dithioxamide compounds which may be used, mention may be made of substituted dithioxamides, particularly, N,N′-disubstituted-dithioxamides such as N,N′-dimethyl-dithioxamide and N, N-′dibenzyl-dithioxamide.

While the above disclosure is directed primarily to a novel copy process, it should be understood that the novel processes and products of this invention may also be used in the production of photographic images.

Since certain changes may be made in the above product and process without departing from the scope of the invention herein involved, it is intended that all matter contained in the above description shall be interpreted as illustrative and not in a limiting sense.

What is claimed is:

1. A copy process comprising contacting a printed page with a copy sheet comprising a support, a layer of a dithioxamide compound and a photosensitive layer consisting essentially of at least one member selected from the group consisting of photopolymerizable monomers and polymers capable of being cross-linked by actinic radiation, exposing said photosensitive layer through said printed page to actinic radiation whereby the exposed portions of said layer are rendered more impervious to extraction by a solvent for said dithioxamide compound than are the non-exposed portions, removing said printed page, applying a processing composition comprising a solvent for said dithioxamide compound to said copy sheet whereby said dithioxamide compound is extracted from said non-exposed portions and transferred to a superposed receiving sheet comprising a layer of a heavy metal salt to form an image of said printed page on said receiving sheet, and removing said receiving sheet.

2. A process as defined in claim 1 wherein said dithioxamide compound is dithioxamide.

3. A process as defined in claim 1 wherein said dithioxamide compound is contained in a water-soluble polar polymer.

4. A process as defined in claim 3 wherein said polymer is polyvinyl alcohol.

5. A process as defined in claim 1 wherein said photosensitive layer contains a photoinitiator.

6. A process as defined in claim 1 wherein said photosensitive layer is tetraethyleneglycol dimethacrylate.

7. A process as defined in claim 1 wherein said photosensitive layer is overcoated with a layer which is substantially impermeable to oxygen.

8. A process as defined in claim 7 wherein said layer is polyvinyl alcohol.

9. A process as defined in claim 1 wherein said processing composition comprises water and alcohol.

10. A process as defined in claim 1 wherein said copy sheet comprises a layer of nickel acetate and copper acetate on a support.

11. A copy sheet comprising a support, a layer of a dithioxamide compound and a photosensitive layer consisting essentially of at least one member selected from the group consisting of photopolymerizable monomers and polymers capable of being cross-linked by actinic radiation, said photosensitive layer being further characterized in that it is capable of being rendered more impervious to solvent extraction of said dithioxamide compound therethrough by exposure to actinic radiation than in the absence of such exposure.

12. A product as defined in claim 11 wherein said dithioxamide compound is dithioxamide.

13. A product as defined in claim 11 wherein said dithioxamide compound is contained in a water-soluble polar polymer.

14. A photosensitive layer as defined in claim 11 wherein said photosensitive layer comprises tetraethyleneglycol dimethacrylate.

15. A product as defined in claim 11 wherein said photosensitive layer is overcoated with a layer which is substantially impermeable to oxygen.

16. A product as defined in claim 15 wherein said layer is polyvinyl alcohol.

17. A process for forming a photographic image, comprising exposing a photosensitive element to actinic radiation, said photosensitive element comprising a support, a layer of a dithioxamide compound and a photosensitive layer consisting essentially of at least one member selected from the group consisting of photopolymerizable monomers and polymers capable of being cross-linked by actinic radiation, whereby the exposed portions of said layer are rendered more impervious to extraction by a solvent for said dithioxamide compound than are the non-exposed portions, applying a processing composition comprising a solvent for said dithioxamide compound to said photosensitive element whereby said dithioxamide compound is extracted from said non-exposed portions and transferred to a superposed receiving sheet comprising a layer of a heavy metal salt, thereby forming an image on said receiving sheet, and removing said receiving sheet.

References Cited by the Examiner

UNITED STATES PATENTS

| | | | |
|---|---|---|---|
| 2,635,048 | 4/1953 | Land | 96—29 |
| 2,662,822 | 12/1953 | Land | 96—29 |
| 2,690,966 | 10/1954 | Minsk et al. | 96—115 |
| 2,992,102 | 7/1961 | Land | 96—29 |
| 3,019,104 | 1/1962 | Oster | 96—29 |
| 3,060,026 | 10/1962 | Heiart | 96—28 |
| 3,076,406 | 2/1963 | Florence | 101—149.5 |
| 3,192,194 | 6/1965 | Burg | 96—28 |

NORMAN G. TORCHIN, *Primary Examiner*.

DONALD LEVY, *Examiner*.